(12) United States Patent
Schulze

(10) Patent No.: US 6,813,987 B1
(45) Date of Patent: Nov. 9, 2004

(54) ELECTROHYDRAULIC MONITORING DEVICE FOR A DUAL EFFECT HYDRAULIC CYLINDER

(75) Inventor: Eckehart Schulze, Weissach (DE)

(73) Assignee: Hartmann & Laemmle GmbH & Co. KG (DE)

( * ) Notice: Subject to any disclaimer, the term of this patent is extended or adjusted under 35 U.S.C. 154(b) by 0 days.

(21) Appl. No.: 10/049,769

(22) PCT Filed: Jul. 31, 2000

(86) PCT No.: PCT/EP00/07368

§ 371 (c)(1),
(2), (4) Date: Sep. 26, 2002

(87) PCT Pub. No.: WO01/12995

PCT Pub. Date: Feb. 22, 2001

(30) Foreign Application Priority Data

Aug. 16, 1999 (DE) .......................... 199 38 132

(51) Int. Cl.[7] .............................................. F01B 31/12
(52) U.S. Cl. ........................................................ 91/1
(58) Field of Search ........................ 91/1, 433; 92/5 R

(56) References Cited

U.S. PATENT DOCUMENTS 3,541,925 A * 11/1970 Guinot ............................. 91/1
3,648,568 A * 3/1972 Wright ......................... 92/5 R
4,275,793 A * 6/1981 Schivley et al. ................. 91/1

FOREIGN PATENT DOCUMENTS

| DE | 2310193 B | * | 4/1974 |
| DE | 3313381 A | * | 10/1984 |
| DE | 4446538 A | * | 6/1996 |
| DE | 29808294 | * | 8/1998 |

* cited by examiner

Primary Examiner—Edward K. Look
Assistant Examiner—Michael Leslie
(74) Attorney, Agent, or Firm—Pendorf & Cutliff

(57) ABSTRACT

The invention relates to an electrohydraulic monitoring device for a dual effect hydraulic cylinder in which certain operating pressures must be maintained. A pressure reduction valve is provided for setting said pressures, this pressure reduction valve being used to set a defined pressure (41) by adjusting the pretension of the valve spring (41). The valve spring is situated in a spring chamber (137) which is bordered by a regulating sleeve (46) on one side, in an axially moveable manner. Said regulating sleeve is displaceable between two end positions within a limited axial stroke area. The alternative switching positions of a micro-switch (117) are linked to these end positions. Two sensor chambers, each of which is connected to one of the pressure chambers of the cylinder in such a way that they communicate, are provided and are delimited by sensor pistons (106, 107) in order to determine the operating pressure that is being coupled into the hydraulic cylinder at a particular time. The alternative subjection to pressure and relief from said pressure of these sensor chambers forces the regulating sleeve into the same end position, respectively.

16 Claims, 3 Drawing Sheets

ELECTROHYDRAULIC MONITORING DEVICE FOR A DUAL EFFECT HYDRAULIC CYLINDER

CROSS REFERENCE TO RELATED APPLICATION

This application is a national stage of PCT/EP00/07368 filed Jul. 31, 2000 and based upon DE 199 38 132.1 filed Aug. 16, 1999 under the International Convention.

BACKGROUND OF THE INVENTION

1. Field of the Invention

Description

The invention concerns an electrohydraulic monitoring device for a dual effect (bi-directional) hydraulic cylinder.

The invention concerns an electrohydraulic monitoring device for a dual effect hydraulic cylinder, wherein the cylinder is divided into two pressure spaces by a cylinder piston, wherein the piston of the hydraulic cylinder and the cylinder housing are configurable into two alternative operating configurations for different functions by the alternative application and relief of pressure to the pressure spaces, and wherein—for example—for safety reasons, the maintenance of a defined operating pressure is necessary, and having the further generic features set forth below. The monitoring device of this type is known from DE-PS 23 10 193.

2. Description of the Related Art

The above-mentioned known monitoring device is realized with an integrated construction, with a pressure reduction valve for adjusting the operating pressure configured in such a manner that functional elements of the pressure reduction valve are also used as functional elements of the monitoring device. The pressure reduction valve is received in a central segment of a borehole extending centrally through a longitudinally extending block-shaped housing. The pressure reduction valve includes a basically cylindrical pot shaped housing part sealed laminarly against the housing borehole, within which a valve piston is sealed laminarly and moveable by pressure within the housing part and supported via a radial flange against the free ring end surface of the cylinder jacket of the pot shaped housing part. A compression helical spring acts on the side of this piston opposite the valve housing, while for its part the pressure reduction valve opposing end is supported against a piston provided slideably pressure-tight in the housing borehole, of which the position within the housing borehole is variable in defined manner for adjustment of a defined pretension of this valve spring by means of a spindle drive means, of which a spindle nut provides the closure of the central borehole on the end of the housing block opposite to the valve. On the side of the pressure reduction valve opposite to the valve spring the central borehole is closed off by a cylindrical pot shaped housing closure part seated in the borehole in the base area fixed to the housing for closing the central borehole, wherein the ring end face of the tubular shaped jacket of the housing closure part facing the movable housing of the pressure reduction valve provides a housing fixed abutment for the valve housing, which demarks at the same time the zero setting or normal position of the valve housing as well as the end position, in which the valve housing of the pressure reduction valve is biased or pushed by the effect of the its valve spring. In this zero position of the valve housing a pushrod or tappet shaped projection of an "inner" sensor piston projects—extending through a central borehole of the base part of the housing closure part and sealed off thereagainst by means of a housing fixed ring seal—and seated pressure tight yet slideable within the inside of a tubular shaped segment of the housing closure part, and extending so far axially out of the housing closure part, that an electrical switch provides an electrical output signal characteristic of the position of the housing of the pressure reduction valve. This sensor piston is supported on the valve housing via a short axial rod-shaped projection on the valve housing, supported on the valve housing side. Between the flange shaped sensor piston setting off or delimiting the two rod shaped projections from each other and the base of the housing closure part, the pushrod shaped piston projection provided for switch operation is surrounded by a ring piston, which is sealed radially inwardly by a further ring seal against the pushrod shaped projection of the flange shaped piston and radially outwardly sealed by means of a sealing flange against the inner cylindrical jacket surface of the housing closure part, wherein this sealing flange on the one hand forms the axial—moveable—border or limit of a sensor chamber, which is bordered housing fixed by the base of the housing closure part, and at the other hand is bordered or limited by the axial border of a second sensor chamber, bordered by a flange shaped sensor piston supported directly on the valve housing and axially moveable. The housing internal space extending between the base of the valve housing and the sensor piston supported thereupon and the receiving space for the valve spring are in communication with each other via housing fixed channels and are thus under the same pressure as the central return flow circuit of the hydraulic system returning to the supply reservoir, which may be lower than that of the operating pressure to be coupled into the monitored hydraulic cylinder of the pressure reduction valve, however may be subjected to significant oscillations or pressure fluctuations of several bar, for example 5 bar. This type of pressure fluctuation could be suppressed by a special leak oil line, which however would be associated with additional expense and complexity. The sensor chambers separated pressure tight from each other by the ring piston are each individually connected to one of the pressure or operating spaces of the double acting hydraulic cylinder, which, depending upon operating mode of the hydraulic cylinder, are alternatively acted upon by the exit or output pressure of the pressure reduction valve, respectively, depending upon the switch position of the operating mode selection valve. The ring surfaces, upon which the sensor pistons are acted upon by the operating pressure existing in the hydraulic cylinder, are so dimensioned, that, as soon as in one of the sensor chambers an operating pressure of a defined high proportion of, for example, 80% of the setting of the valve spring as predetermined by presetting of the valve spring, is reached, which causes the flange shaped sensor position supported on the valve housing to slide relative to the valve housing, whereby the valve housing is axially deflected out of its base position or starting position relative to the housing closure part and with significant increase of the pretension of the valve spring, executes a deflection stroke a to a second position marked or defined by an inner abutment ring of the housing, which corresponds to a control position of the valve piston, in which the pressure supplied or coupled in to the cylinder is slightly higher than that pressure, which corresponds to the valve spring pretension, which was preset during the adjustment operation of the pressure reduction valve.

Independent there of which operating mode the main cylinder is being operated in, that is, in which of its operating or pressure spaces the operating pressure needs to be built up, this coupling in into one of its two sensor chambers always leads thereto, that the valve housing reaches its end position deflected by the stroke a relative from its "pressureless" starting position. There in there is, depending upon in which sensor space the monitored pressure is coupled in, either the valve housing closest sensor piston alone is forced towards the valve housing and the other against the base of the housing closure part, or both sensor pistons are collectively pushed towards the valve housing. In both cases the rod shaped pushrod projection of the sensor piston on the valve side lifts off from the operating element of the switch, whereupon this, after the valve housing has carried out approximately a/2 of the deflection stroke, returns to its starting position, in which the switch starting signal indicates, that the operating pressure in the main cylinder is achieved, that is, the hydraulic device is operating as normal. If the actuating or operating pressure is not achieved for reason of some malfunction or defect, then this signal does not occur, and a signal combination remains established, which for example prevents that a machine is brought into operation, or if the signal first is established and then is lost, it is caused, that the machine is caused to switch off.

The known monitoring devices, on the as a result of their design and function as described above, are limited by at least the following functional disadvantages:

The ring seal, by means of which the pushrod shaped actuating element is sealed at its output side towards the switch is sealed against the housing closure part must remain sealed pressure tight against the relatively high pressure and thus must always be under a minimum pretension. This has the consequence that a relatively high friction occurs, which can be equivalent to a pressure of several bar. This seal thus has an influence of reducing the sensitivity of the monitoring. The friction resistance of this seal must be overcome, when both sensor pistons are to be displaced or moved collectively. This applies when the pressure need only be monitored in the respective main cylinder pressure chamber which is coupled into the base-side sensor pressure chamber of the monitoring device.

If in contrast the pressure must be monitored in that pressure space of the main cylinder, which is in communication with or coupled to the respective sensor chamber of the monitoring device which is bordered in the axial direction by the two sensor pistons, then the sensor piston on the valve housing side must be moved against both the friction of the outer ring seal as well as against that which unfolds against or is deployed against the ring seal of the ring shaped sensor piston, that is, the moveable piston must be deflected or moved against approximately twice the amount of the friction, with a consequence, that the sensitivity of the monitoring device, defined as the relationship $P_{intended}/P_{actual}$ of the for adjusting the valve spring pretension preset intended operating pressure $P_{intended}$ to the pressure $P_{actual}$, which is the minimal requirement in order to overcome or break the static or cohesive friction of the ring seal of the sensor piston, is reduced to approximately one half of the respective value, which applies for the first mentioned case. This is not of consequence so long as the monitored operating pressures are relatively high and the frictional resistant equivalent pressures are relatively small in comparison. If the monitored pressure for its part is however relatively low, then the possibility of malfunction or false positions is increased.

In addition to this, the known monitoring device during actuation, that is, as soon as the deflection stroke of the valve housing starts, tends to oscillate, since an axial displacement of the valve housing from a resting position of the valve piston, which corresponds to an equilibrium condition, to a sudden increase of the flow cross section of the "valve internal" flow path of the flow cross section from the high pressure (P)-supply connection of the pressure valve to its user (A)-connection as well at the same time leads to a reduction of the flow cross section of the "valve internal" flow path connecting the in the regulating operation the user (A)-connection with the return path (T)-connection of the valve, whereby a drastic unsetting of the equilibrium results, whereupon the thereby resulting oscillation can only "settles" or decay after the valve finds a new control position.

SUMMARY OF THE INVENTION

It is thus the task of the invention to improve a monitoring device of the above described type in such a manner, that without interfering with the simplicity of construction, a significant increase in sensitivity of the monitoring device results which enhances sensitivity for both of the sensor pistons.

This task is inventively solved by the characterizing features of the present invention.

The sensitivity of the inventive monitoring device is essentially determined solely by the friction resistance, against which the sensor pistons and the actuating elements must be slid, which however can be maintained very small, since the relevant seals therefore need merely be capable of sealing against a relatively low pressure, so that significant pretension of this seal is not necessary.

The sensitivity of the monitoring device is practically the same for both operating modes or types of the hydraulic cylinder, since both sensor ring pistons can be sealed in laminar seals against, on the one hand, the slide guide tube or pipe in which they are received and, on the other hand, the central bore of the housing block, in which they are received, which besides the dampened moving friction in the actuated condition causes practically no friction.

The monitoring device is so designed that it can be used in combination with a conventional pressure reduction valve, since this, aside from requiring a small constructive change of the spring receiving space for preventing rotation of the adjusting jacket, in which the valve spring with its piston end is supported against the spring plate, requires no constructive changes, in contrast to the known devices, in which the valve housing must be made moveable, so that can be used as adjusting jacket for the monitoring device.

The design according to an embodiment of the present invention, with the narrow needle shaped actuating element extending through housing borehole as a step borehole, with sealing stage open towards a hollow space in which the ring flange of the adjusting jacket is received, in communication with the tank of the pressure supply assembly via the return flow circuit, of which the diameter is larger than the diameter of guide stage of this bore which is in communication with the oil-free switch receiving space, has the advantage, that, as described below, two lip seals can be received "sequentially" by this sealing stage which for the already mentioned safety reasons preferably, particularly good sealing of the mentioned spaces relative to each other, at the same time double safety of the sealing, provide, which is further increased thereby, that between the two lip seals, preferably in the area of that one, which faces the oil filled space, a radial relief channel is provided, so that, in case the oil space side pressure seal is damaged, this event is recognizable by a trickling out of oil, before the danger occurs, that oil can accumulate in the switch receiving space.

The type of the rotational coupling according to a preferred embodiment of the present invention with the threaded spindle provided for adjusting the spring pretension with a rotatable however axially non-displaceable adjusting shaft is particularly suitable for a manual adjustment of the spring tension as well as for an electric motor adjusting thereof.

By the design of the housing jacket of the slide guide jacket of the threaded spindle provided according to a preferred embodiment of the present invention, there is achieved as a result, a pressure equalizing or balancing arrangement of the adjusting jacket within the through going borehole of the housing block of the monitoring device, such that pressure surges, which could occur in a common or communal return circuit of the hydraulic total system, and therewith also in oil spaces of the monitoring device in communication with this circuit, cannot have an effect on the position of the adjusting jacket (control casing) of the monitoring device.

The design of the surface relationship $F_S/F_R$ of the control surface $F_S$ of the piston of the pressure reduction valve to the ring surface $F_R$ of the sensor positions of the monitoring device according to a preferred embodiment of the present invention results in a wide range of variation of the operating pressures predetermined by adjustment of the spring pretension to a reliable response of the monitoring device.

For this, under the context of the precise predetermination of the operating pressure to be monitored, in particular under the condition of relatively low operating pressures, the type of supporting of the threaded spindle according to a preferred embodiment of the present invention via a roller bearing against a valve spring axially supporting plate spring, of which a preferred design is discussed below.

This low friction design of the adjusting means provided for adjustment of the spring pretension is particularly of advantage, when for this an electric motor adjusting means is provided for adjustment, for which suitable design and arrangement possibilities are set forth below.

The preferred design of the monitoring device according to an alternative preferred embodiment makes possible in simple manner the recognition of malfunctions such as, for example, a blockage of the adjusting or control cylinder or also an increase of leakage loss in the operational circuit and, as a result, the implementation of supplemental safety functions.

It is particularly advantageous, when, as described below, a flow regulation valve is provided between the pressure reduction valve for setting the operating pressure and the pressure monitored hydraulic drive element, by means of which a defined value of a hydraulic oil flow streaming into a pressure monitoring drive cylinder is adjustable and therewith a defined basis for a comparison of a measured time parameter with a expected value associated therewith can be obtained.

BRIEF DESCRIPTION OF THE DRAWINGS

Further details of the inventive monitoring device can be seen from the following description of a preferred embodiment on the basis of the figures. There is shown.

DETAILED DESCRIPTION OF THE INVENTION

Figure 1:
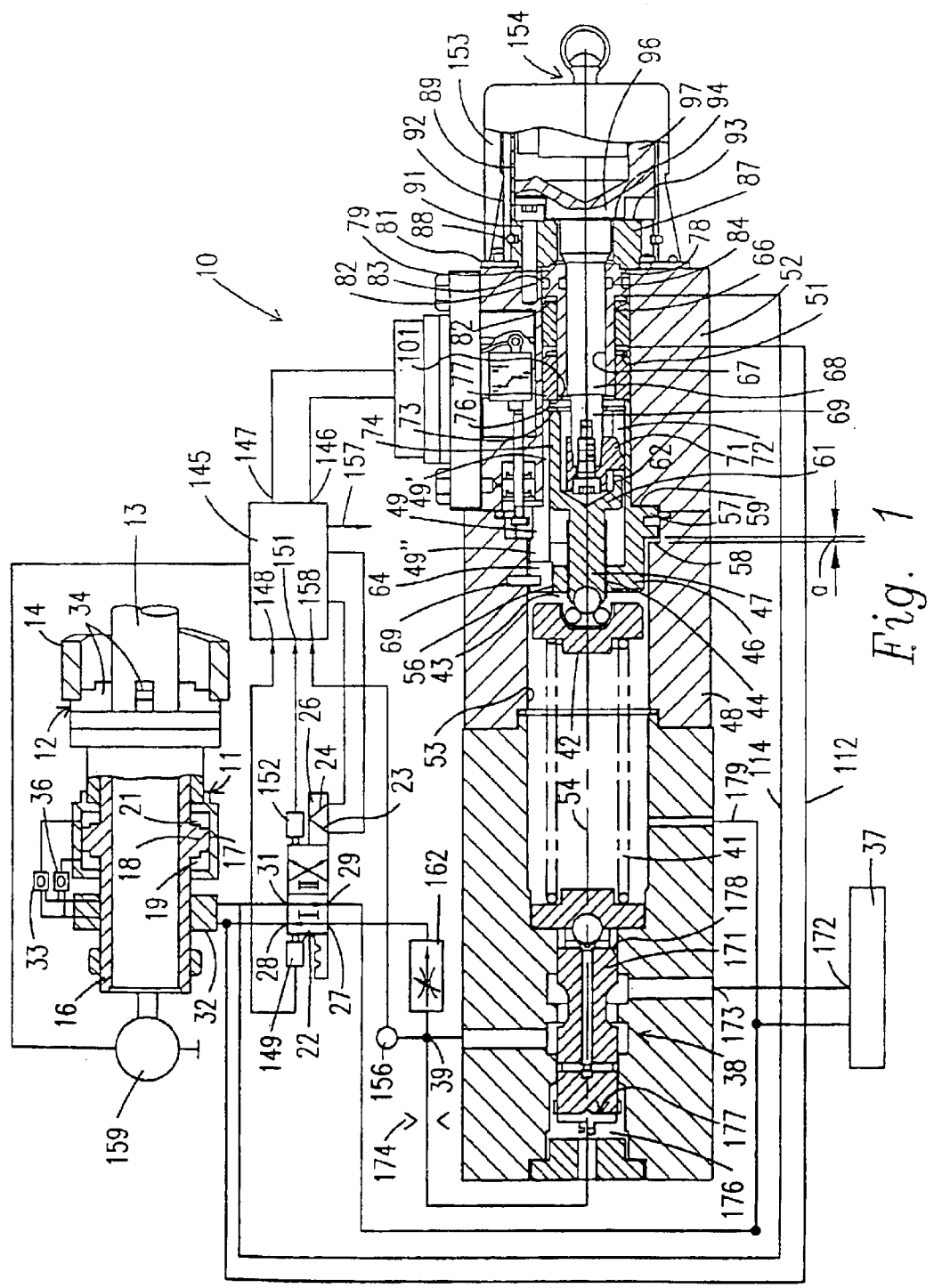
FIG. 1 an electrohydraulic circuit diagram of an inventive monitoring device using, as an example, a clamping cylinder, which is controllable into alternative functional positions by alternative pressure actuation and relief of two pressure spaces and FIGS. 2a and 2b alternative functional positions of sensor pistons of the monitoring device, which are associated with the alternative operating modes of the drive cylinder of the clamping device according to FIG. 1.

The purpose of the electrohydraulic monitoring device indicated overall in FIG. 1 with the reference number 10 is in general to continuously monitor the operating pressure of hydraulic mechanical element of the machine as necessary for the safe operation of the machine and, in case the operating pressure drops below an adjustable predetermined value, produces an appropriate electronic indication signal, by means of which, for example, a turning off of the machine for safety reasons, or an automatic introduction of safety functions, can be set in motion.

It is presumed, in the case of the illustrative embodiment used herein for exemplary purposes, that the machine element of which the function is being monitored is a double acting linear hydraulic cylinder 11 for example a clamping cylinder or a hydraulic turning machine, wherein this clamping device 12, for its part, makes possible a clamping of, a for example, a cylinder shaped workpiece 13 "from outside" and, in the alternative, makes possible a clamping of a, for example, cylindrical shaped workpiece 14 "from inside". These alternative tensioning functions of the tensioning device 12 are alternative directions of the stroke movement of the rotation spindle 16, that is, alternative directions of the deflection of the rotation spindle 16 along a segment of its length outside surrounding cylinder housing 17 relative to a spindle fixed piston flange 18 associated, through which within the cylinder housing 17 two ring shaped pressure spaces 19 and 21 are segregated pressure tight relative to each other, through which the alternative pressure increase and release the deflection of the cylinder housing 17 and therewith the type of the workpiece clamping is selectable.

For selection of the type of operation, that is, the direction of the deflection of the cylinder housing 17 which leads to the desired type of the clamping, there is provided a magnet valve or direction control valve 22 in the form of a 4/2-way valve with fixed functional positions I and II, which by alternative actuation of two control coils 23 and 24 of a switch magnet 26 is switchable out of the previously assumed switch position I or II into the thereby alternative switch position II or as the case may I.

In the switch position I of the direction control valve 22 the P-high pressure supply connection 27 thereof is connected with the A-user connection 28 and the T-return flow connection 29 is connected with the B-user connection 31; in the other switch position II the P-supply connection 27 is connected with the B-user connection 31 and the T-return flow connection 29 is connected with the A-user connection 28.

The A-user connection 28 is connected via a rotion transmission indicated overall with reference number 32 and is connected via an appropriate return valve 33 with that "clamp jaw side" pressure chamber 21 of the hollow cylinder 11, which, with pressure actuation and with simultaneous pressure release on the other cylinder chamber 19 of the housing 17 of the hydraulic cylinder 11, causes a displacement directed on the clamping jaws 34 of the clamping device 12 according to the representation towards the right, while the B-user connection 31 is connected with the respective pressure chamber 19 of the hydraulic cylinder 11 via the rotary transmission 32 and a further associated rebound valve 36, via the pressure actuation of which, upon simultaneous pressure release of the "right" jaw side pressure chamber 21 of the cylinder housing 17, experiences a displacement directed away from the jaws 34 of the tensioning device 12.

The rotation transmission 32 is necessary, since the rotation drive of the machine rotates the cylinder housing 17 with the rotation spindle 16. In the normal rotation operation of the machine, that is, when on one of the two user connections the direction control valve 22 is acted upon by high operating pressure, then both appropriate rebound valves 33 and 36 are opened; if the pressure drops, then both rebound valves 33 and 36 return to their blocking position, so that oil cannot escape out of the pressure chambers 19 and 21 of the hollow cylinder 11.

For adjusting the spring tension, which is coupled into the respective pressure chamber 19 and 21 of the hollow cylinder 11, a pressure reduction valve 38 is provided in conventional manner between the schematically illustrated pressure supply assembly 37 and the P-supply connection 27 of the direction control valve 22, wherein its output pressure measured at its discharge 39, used for pressure supply of the hydraulic cylinder 11, can be preset by adjustment of the pretension of the valve spring 41, whereby the starting pressure is proportional to the pretension of this spring.

The pressure reduction valve 38 is, according to its function, a regulated three-way valve, of which the valve piston 171 is urged in one extreme position by the pretension of the valve spring 41, in that its P-supply connection 173 connected with the pressure output 172 of the pressure supply aggregate 37 is connected with the output 39 of the pressure reduction valve via a valve internal flow path of large flow cross section. The starting pressure existing for an instant at the output 39 of the pressure reduction valve is coupled via shutter 174 in a control chamber 176, which one sided axially moveably is bordered by an end flange 177 of the valve piston 171 with a value $F_S$. On its other—spring side—end face surface 178, of which the effective value is $F_S$ just as that of the control surface 177 which borders the control chamber 176, the valve piston 171 is subjected to pressure, which exists in the space 137 which contains the valve spring 41, is connected which at the common tank return flow line 179, to which also other—not shown—users or auxiliary systems of the hydraulic system of the machine are connected. If the starting pressure PA of the pressure reduction valve 38 increases due to an increase in the load, then a force of the value $F_S \cdot P_A$ is exercised against the spring tension upon the valve 171, with the result or tendency, to increase the spring pretension. As soon as this force exceeds the spring pretension, the valve piston then experiences a deflection, under the precondition, that the pressure in the spring space 137 can be ignored, which deflection in the sense of a reduction of the flow cross-section of the flow path leading from the P-supply connection 173 to the pressure discharge 39 of the pressure reduction valve and ends in a control position, in which, depending upon the pressure PA, the pressure output 39 is alternatively connected with the P-supply connection 173 or with the spring space 137 connected with the return flow line 179, respectively, with small overload flow cross-section. In this control position the output pressure of the pressure reduction valve 38 corresponds with the operating pressure preselected by the adjustment of the spring tension.

For adjustment of the pretension of the valve spring, which is tensioned between the piston 171 of the pressure reduction valve 38 and a valve plate or disk 42, a spindle drive indicated overall with reference number 43 is provided, which has a threaded spindle 47 which by rotation of the threading 44 of the adjustment jacket 46, which is secured against rotation with respect to the housing part 48 of the pressure reduction valve 38, undergoes an axial displacement and engages centrally against the side of the spring plate 42 opposite the valve spring 41, which thereby, depending upon direction of rotation of the threaded spindle 47, is displaceable in the sense of an increase or a reduction in the pretension of the valve spring 41.

The adjusting jacket 46 is, depending upon its basic shape, in the form of a cylindrical pot and is guided with a relatively thin-walled segment 49' of its housing jacket 49 axially slideable in a central, through-going borehole 51 of a housing block 52 of the monitoring device 10, which is so positioned or oriented to the housing part 48 which receives the valve spring and the spring plate 42 as well a base side segment of the adjusting housing 46, that the central bore 51 of the housing block 52 and the central bore 53 of the spring 41 receiving housing part 48 is coaxial relative to the common central longitudinal axis 54 of the pressure reduction valve 38 and the monitoring device 10.

Between the thin-walled guide segment 49' of the housing jacket 49 and a thick walled jacket segment 49" from the base side extending into the valve housing 48, which connects with the base 56 of the adjusting jacket 46 which is provided with a central threading 44 and at the same time forms the spindle nut, which is provided with a radially outward ring flange 57, through which alternatively lying against one of the oppositely lying, planar ring shaped support surfaces 58 and 59 of the valve spring 41 containing housing part 48 or as the case may be the housing block 52 of the monitoring device 10, achieves an abutment limitation of the axial deflection of the adjustment jacket 46 upon a maximal deflection stroke.

This maximal deflection stroke a, which corresponds to the difference between the axial separation of the ring shaped support surfaces 48 and 52 lying opposite to each other and the axial thickness of the ring flange 57 of the adjustment jacket 46, is small in comparison to the axial deflection stroke of the spring plate 42 achievable by rotation of the threaded spindle 47 for adjustment of a desired spring pretension, and is equal to only about $\frac{1}{10}$ to $\frac{1}{20}$ of the overall possible spring adjustment stroke.

The threaded spindle 47 extends from the base area 61 of a basically cylindrically pot shaped slide guide housing 62, which is rotatable in the circular cylindrical inner space of the adjustment jacket 46 and is mounted to be slideable axially back and forth relative to the adjustment jacket 46.

The adjustment jacket 46 is secured against rotation about the central longitudinal axis 54 of the total device by means of a tab or plug 63 projecting into the central bore 53 of the valve spring 41 receiving housing part 48, which is in slideable form-fitting engagement with an axially extending external groove 64 of the base side of the jacket segment 49" of the adjustment jacket 46.

A slide guide tube 66 is seated in the central bore 51 of the housing part 52, in coaxial arrangement with respect to the central longitudinal axis 54 thereof, which forms with its inner jacket surface 67 the slide surface for the rotateable mounting of an adjustment shaft 68 coupled rotationally with the slide guide jacket 62, which projects with the slender projection 69 into the slide guide jacket 62 of the threaded spindle 47. On this projection there is secured fixed against rotation a vane shaped, radially projecting rotation-coupling element 71, which, as a result of form fitting engagement with a longitudinal slit 72 of the core jacket of the slide guide jacket, takes this along upon rotation of the adjustment or control shaft, which due to the threaded engagement of the spindle 47 with the central threading 44 of the adjustment jacket 46 results in an axial displacement of the spring plate 42.

For adjustment of the maximum of the valve spring useable deflection stroke of the slide guide jacket 62 or, as the case may be, the threaded spindle 47, the slide guide jacket 62 is subjected to abutment action by being supported on the base area 61 of on the base 56 of the adjustment jacket 46. For the setting of a minimum spring pretension usable work stroke of the guide glide surface 62, the free ring shaped end surface 73 of the housing jacket 74 is, by axial supporting, limited by a circlip 76, which is seated in an inner ring groove of the adjustment jacket 46 and is provided in immediate proximity of the circular shaped end surface 77 of its thinner walled jacket segment 49'.

In a typical arrangement of the pressure reduction valve 38 and its valve spring 49, the end position of the slide guide jacket 62 associated with the maximum spring pretension is associated with an output pressure of the pressure reduction valve 38 of 80 bar, and for the minimum pretension of the valve spring 41 corresponding to the end position of the slide guide jacket 62 is associated with an output pressure of 10 bar.

The outer diameter of the slide guide tube 66 is significantly smaller than the diameter of the through-going central bore 51 of the housing block 52 of the monitoring device 10 and also smaller than the inner diameter of the thin walled segment 49' of the control jacket 46.

The slide guide tube 66 has a radial sealing flange 78 on its outer side opposite the control jacket 46, of which the outer ring surface runs co-planar with the outer end surface 81 of the housing block 52 contained in the monitoring device 10. The sealing flange 78 of the slide guide pipe 66 is provided with an external nut 82, in which a seal ring 83 is seated, by means of which the ring flange 78 or, as the case may be, the slide guide pipe 66 is sealed against pressure in the axial through-going bore 51 of the housing block 52 of the monitoring device 10. In the area of the ring flange 78 of the slide guide pipe 66 this is provided with an internal groove 84, in which a further seal ring 86 is seated, by means of which the slide guide pipe 66 is sealed high-pressure tight against the control shaft 68 extending through the slide guide pipe 66. The slide guide pipe 66 and the therein rotatably mounted control shaft 68 are secured against axial slippage relative to the housing block 52.

For securing of the slide guide pipe 66 relative to the control shaft 68 against axial sliding, there is provided an anchor jacket in the form of a cylindrical pot indicated overall with reference number 87, which is so positioned or seated in coaxial arrangement relative to the central longitudinal axis 54 of the housing block 52, that its base 88 lies against the outer end surface 81 of the housing block 52, and its thin walled jacket 89 is oriented facing away from the housing block 52.

The jacket base 88 has a central through going bore 91, through which a transition segment 92 of the control shaft 68 extends, of which the diameter is slightly smaller than the diameter of the through borehole 91 of the anchor casing 87. The radial sealing flange 78 of the slide guide pipe 68 is axially supported with a periperial area of its outer ring end surface 79 against the bore edge of the anchor casing 87 facing it. On the ring flange 93 of the jacket base 88, which is opposite to the sealing flange 78 of the slide guide pipe 68, the control shaft 68 is axially supported with a radial ring end face 94 of a support segment 96 of larger diameter, connected to the transition section 92 of the control shaft 68, upon which a pipe shaped end segment 97 of the control shaft 68 follows, of which the outer diameter corresponds to the inner diameter of the casing jacket 89 which forms an outer rotating mount for the control shaft 68.

Figure 2A:
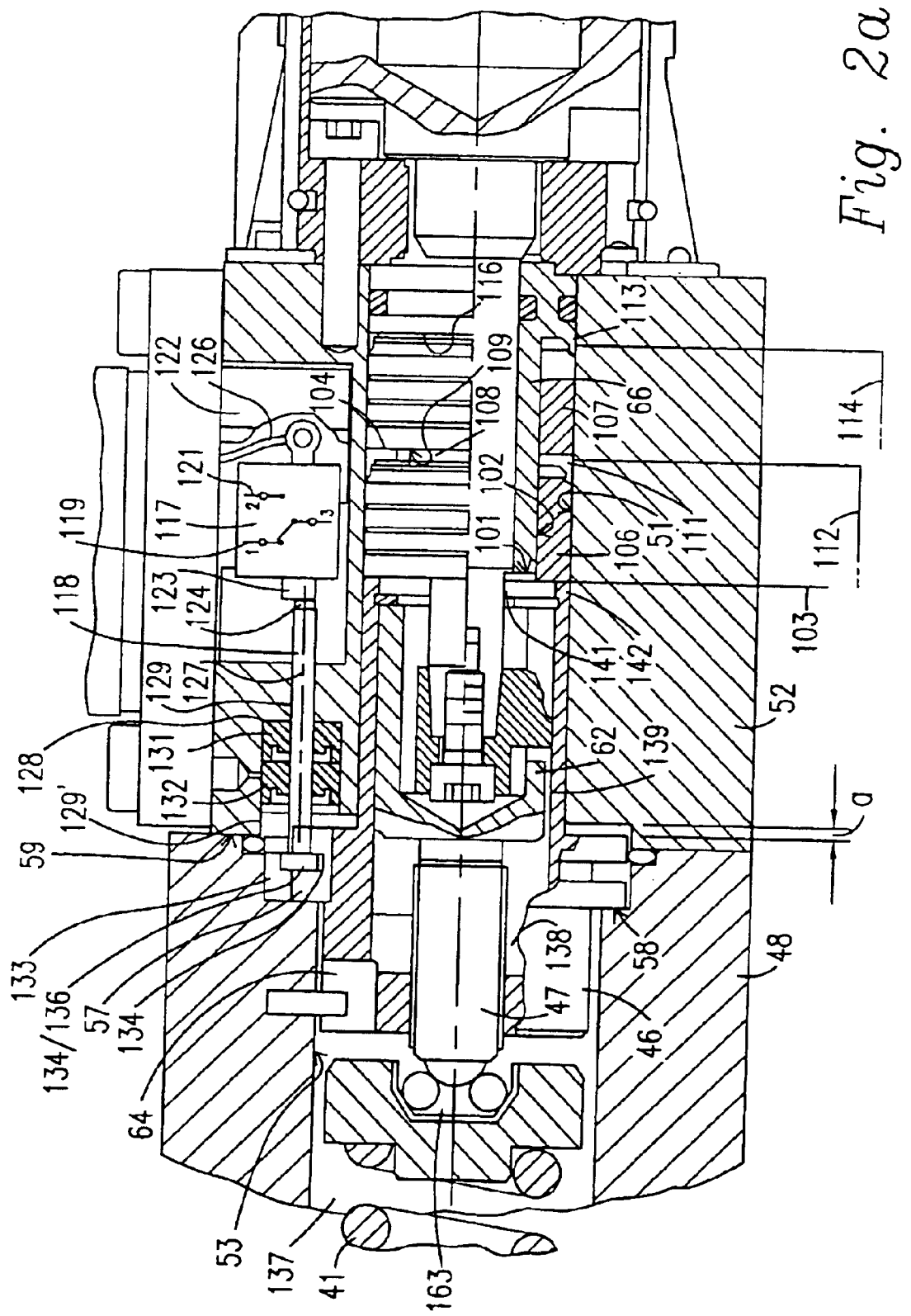

A sliding out of the control shaft 68 out of the slide guide pipe 66 is prevented by a circlip 98 which is seated in an outer ring groove 99 of the segment of the control shaft 68 passing through the slide glide pipe 66 and which is supported axially at the inner ring face 101 of the slide guide pipe 66 (FIG. 2a).

A ring space 104 is bordered radially outwardly by the through bore 51 extending centrally through the housing block 52 of the monitoring device 10, and radially inwardly by the outer jacket surface 102 of the slide guide pipe 66, which is closed off axially fixed to the housing by the sealing flange 78 of the slide guide pipe 66 and which extends to approximately the cross sectional central plane 103 of the central bore 51 of the housing block 52, which in the represented position of the control housing 46 is marked by the plane, through which the planar ring shaped end face 77 of the control jacket 46 extends.

In this ring space, two ring pistons 106 and 107 are provided axially slideable, which are sealed radially inwardly against the slide guide pipe 66 and radially outwardly against the central bore 51 of the housing block 52 of the monitoring device 10.

The ring surfaces 108 and 109 of the two ring pistons 106 and 107 arranged facing each other form the axial boundaries of a first ring shaped pressure sensor chamber 111 (FIG. 2a), which in the represented embodiment is connected via a pressure sensor line 112 with the A-user connection 28 of the direction control valve 22. The ring piston 107 provided adjacent the sealing flange 78 of the slide guide pipe 66 forms the axially moveable boundary of a second ring shaped pressure sensor chamber 113 (FIG. 2b), which is closed off axially housing-fixed by the sealing flange 78 of the slide guide pipe 66. This second pressure sensor chamber 113 is connected with the B-user connection of the direction control valve 22 via a second pressure sensor line 114.

Presuming a normal operation of the pressure supply assembly 37, the pressure reduction valve 38 and the clamping device 12, in functional position I of the direction control valve 22 the increased output pressure of the pressure reduction valve is coupled into the pressure sensor chamber 111 defined by the two ring pistons 106 and 107, the A-sensor chamber, and the second sensor chamber 113; the B-sensor chamber 113, is relieved of pressure. This has the consequence, that the ring piston 107 adjacent the sealing flange 78 of the slide guide pipe 66 is urged to make contact with the sealing flange 78 and the other ring piston 106 is urged against the control jacket 46. If, on the other hand, the direction control valve 22 is switched in its functional position II, then the operating pressure is coupled into the B-sensor chamber 113, while the A-sensor chamber 111 is relieved of pressure, with the consequence that a force in the same direction and the same amount is imparted to the control jacket 46 as in the case of the pressure introduction in the A-sensor chamber 111.

The size of the ring piston end faces 108 and 109, which axially border the A-sensor chamber 111, and the piston ring end faces 116, the sealing flange side ring piston 107, which form the axially moveable borders of the B-sensor chamber 113, are respectively equal and significantly, for example 10 to 15%, larger than the control surface $F_S$ subjected to the output pressure of the pressure reduction valve 38, through which the pressure actuation or impulse urges the piston 171 of the pressure reduction valve against the pretension of the valve spring 41 in the control position, which corresponds to the setting of the spring pretension preset starting pressure of the pressure reduction valve.

By this dimensioning of the ring piston 106 and 107 it is insured, that whenever the operating pressure corresponding to the spring pretension exists at the A-user connection 28 or at the B-user connection 31 of the direction changing valve 22, the control jacket 46 assumes the end position associated with the normal function of the clamping device 12, which is demarked by the contacting or bearing of the radial outer ring flange 58 of the control jacket against the ring shaped support surface 58 of the valve spring 41 receiving housing part 48. In this position of the control jacket 46 there is switched in its base position an end switch 117, in the form of a micro-switch, which is switchable via actuating element 118 moveably coupled with the control jacket 46, through means of which in a first circuit output 119 a position indicating signal is provided, which is characteristic for the mentioned position of the control jacket 46.

If ever the pressure of the respective user output 28 or 31 of the direction control valve 22, at which the output pressure the pressure reduction valve 38 should be depending upon the switch position I or II, is less than the intended value multiplied with the relationship $F_S/F_R$ ($F_R$=effective amount of the ring end face of the sensor piston 106 and 107), the position jacket 46 is pushed by the pretension of the valve spring 41 in the position represented in the FIG. 1, in which its radial ring flange 57 is removed or distanced by the stroke a from the ring shaped support surface 58 of the valve spring 41 receiving housing part 48. In this position of the control jacket 46 the end switch 117 is switched to a switch position, in which a therefore characteristic output signal is transmitted in a second circuit output 121. If and so long as this signal exists at the second output 121 of the switch 117, then the rotation drive of the spindle 16 of the rotating machine cannot be activated.

In the illustrative embodiment used for illustrative purposes the switch 117 is in the form of an electromechanical switch, which is switchable by displacement occurring in alternative directions parallel to the central longitudinal axis 54 and which has a switch element 123, which is maintained by a switch spring 126 in contact with the free end 124 of the actuating element 118 in the form of a needle-shaped rod. The actuating element 118 extends, with its longitudinal axis 127 running parallel to the central longitudinal axis, through a two stage, overall with reference number 128 indicated bore hole of the housing block 52, which extends between the oil free receiving space 122 for the switch 117 and the spring space side planar support surface 59 of the housing block 52. This step bore 128 has a guide segment 129 extending from the oil-free switch receiving space 122, of which the diameter, with slight over dimensioning, corresponds to the needle shaped actuating element 118 and a, with respect to the this guide segment 129, extending sealing segment 129' set off by a radial shoulder, within which the actuating element 118 is sealed by two directly adjacent provided lip seals 131 and 132 against the seal segment 129'. The seal segment 129' communicates with the hydraulic oil filled ring space 133, within which the radial outer ring flange 57 the control jacket 48 disposes and between the ring shaped support surfaces 58 and 59 of the housing part 48 and the housing block 52 is slideable back and forth.

For movement coupling of the actuating element 118 with the control jacket 46 the radial ring flange 57 thereof is provided with an external groove 134, in which the actuating element 118 is coupled form fittingly with the anchor head 136, that is hung in fixed against pulling and pushing. By the mentioned design of the actuating element 118 and sealing of the same against the ring space 133 existing under the same hydraulic pressure as the spring space 137, that is, the pressure of the hydraulic oil flowing back from the hydraulic cylinder 11 at the beginning of the clamping process, a particularly low-friction glide guidance of the actuating element 118 in the housing block 52 is achieved, which is beneficial to the sensitivity of the monitoring device 10.

The communicating connection of the ring space 133, in which the radial ring flange 57 of the control jacket 46 is provided, with the spring receiving space 137 of the pressure regulating or reduction valve 38 controlled housing part 48, is so established, that the diameter of the segment 49" of the control jacket 46 projecting into the spring receiving space 137 is narrower than the diameter of the central bore 53 of the spring 41 receiving housing part 48.

The spring space 137 projects above the external groove 64 provided for fixing against rotation of the control jacket, which groove communicates with the base side inner space 138 of the control jacket 46, and an internal longitudinal groove 139 extending between this and the longitudinal slit 72 of the housing jacket of the slide guide housing 62 also is in communicating connection with the sensor position-side internal space 141, which over the major portion of its length is bordered or surrounded by the slide guide jacket 62 and in a short, piston side segment 142 of the thin walled jacket segment 49' is surrounded by the control jacket 46.

For the pressure reduction valve 38 a design is envisioned, in which the piston end face $F_S$ of the valve piston, which is subjected to the regulated pressure, has the same area as the surface bordering the spring space 137. If a pressure increase occurs in the spring space 137 of an amount $\Delta p$, then this corresponds to an increase in the spring pretension of an amount $F_S \cdot \Delta p$ and, as a result, an increase of the pressure coupled into the respective sensor chamber 111 or 113 of the monitoring device 10 and the same amount $\Delta p$, with a consequence, that the forces resulting from the pressure increase of $\Delta p$, which act upon the control jacket side sensor piston 106 or via these in a second sensor piston 107 engaging forces by the coupling in of appropriate elevated pressure in the sensor chamber 111 or as the case may be 113 are minimally overcompensated and out of the— temporarily—pressure elevated by $\Delta p$ no erroneous switching of the end switch 117 can result, since the control jacket 46, presuming normal function of the overall unit, experiences no displacement from the abutment position represented in FIGS. 2a and 2b. The monitoring device 10 is therewith completely insensitive against the pressure peaks, which could occur in the spring space 137 or as the case may be in the T-return lines 179 (FIG. 1). This is particularly of consequence when the operating pressures, with which the clamping device 12 is to be operated, lie in the low pressure range of between 40 and 20 bar.

For explanation of the function of the device it is presumed for the end switches 117 that the starting signal given drops at its first output or movement 119 upon normal function of the clamping device 12, when the control jacket 46 has carried out approximately one-half of the valve a/2 of its maximal deflection stroke and whereupon the output or starting signal for malfunction exists at the second output or departure or termination 121 of the switch. Similarly the end switch 117 is switched to its normal function characteristic switch position when the control jacket, starting from the position represented in FIG. 1, has carried out one-half the maximal deflection stroke in the direction towards its end position represented in FIGS. 2a and 2b.

For explanation of further functions of the monitoring device 10 reference is made to the electro-hydraulic circuit diagram of FIG. 1:

The monitoring device 10 includes an essentially schematic illustrated electronic control unit 145 which for example can be implemented by suitable programming of a not in greater detail shown SPS-control or a CNC-control of the rotating machine represented by the clamping device 12.

This electronic control unit is wired or connected to separate inlets 146 and 147 of the alternative output signals of the end switch 117. At a third inlet 148 the output signal of a position monitoring switch 149 is supplied to the electronic control unit 145, which indicates that the piston of the direction control valve 22 is situated in a position corresponding to function position I. At a fourth inlet 151 the electronic unit 145 is supplied with the output signal of a further position monitoring switch 152, which indicates that the piston of the direction control valve 22 is situated in the position corresponding to the functional position II of this valve.

It is presumed that the inner clamp operating mode of the clamping device 12 corresponds to functional position I and the external clamp is associated with functional position II of the direction control valve. If the rotation machine is to be operated in the internal clamp drive mode, then for preparation of the rotation operation first the direction control valve 22 is switched to the external clamp operating associated function position II, in which the clamp jaws 34 are pressed radially outwardly, that is, the clamping device 12, with reference to the inner clamping operation is "unclamped" and a workpiece 14 to be processed in the inward clamp is brought into a position suitable for clamping. In this "opened" position of the clamping device 12 the operating pressure necessary for the workpiece processing is set. The therefore necessary adjustment of the pressure reduction valve 38 occurs for example manually by means of a rotation knob 153, which in conventional manner by unlocking of a schematically represented lock 154 can be coupled with the tubular shaped end segment 97 of the control shaft 68 extending from the anchor jacket. For determining or finding the operating pressure to be set, a pressure measuring device 156 is provided connected to the output 39 of the pressure reduction valve 38.

It is understood that, for setting of the operation pressure, it is also possible to use a—not shown—electric motor control means, which is controllable relative to the intended pressure control output 157 of the electronic control unit 145. For this type of the operating pressure adjustment or setting an electronic pressure sensor is used as a pressure measuring device 156, of which the pressure characteristic output signal is supplied as a relevant actual value input 158 of the electronic control unit, which compares the actual value with an adjustable preset intended value and from this comparison produces the necessary output signal at the intended value control output 157 for the control drive.

Simple possibilities for the adjustment of the operating pressure by means of an electric motor control drive can also be comprised therein, that the servo-motor is a step motor, which can be used for carrying out the pre-tensioning adjustment stroke by controlling with a predetermined number of control pulses, with which respectively one incremental control stroke is associated, and further an analog or digital position measuring system for monitoring the pre-tensioned control stroke of the spindle 47 relative to the slide guide tube 62 and/or the valve spring 41 relative to its spring plate 42 could also be an analog or digital position measuring system.

During the operating pressure adjustment phase the output pressure of the pressure reduction valve 38 is coupled in, according to FIG. 1, the left pressure space 19 of the hollow cylinder 11, while the right pressure space 21 is relieved of pressure. The cylinder housing 17 is, during the stationary condition of the adjustment phase, displaced in its end position relative to the rotation transmission 32. The pressure impinging against the B-user connection 31 of the direction control valve 22 is coupled also to the second sensor chamber 113 of the monitoring device 10, of which the other pressure is sensor chamber 111 is relieved of pressure. Both sensor pistons 106 and 107 are displaced to the left according to the representation in FIG. 2b, and the control jacket 46 is supported by its ring flange 57 on the radial ring shaped support surface 58 of the valve spring 41 receiving housing part 48. The end switch 117 assumes the starting position, at which the switch output signal is provided to the first switch output 119. As long as this switch output signal—at the first switch output 119— exists and an "internal" operating type selection signal of the electronic control unit exists, which signals the setting of the electronic control unit 145 for internal clamping operation, the rotation drive 159 (FIG. 1) of the rotation spindle 16 cannot be brought into operation.

For clamping the workpiece 14 there a control impulse is transmitted, manually or computer controlled, by the electronic control unit 145, via which the direction control valve 22 is switched to its functional position I. In this functional position of the direction control valve 22 the left pressure space 19 of the hollow cylinder 11 is relieved of pressure and the right pressure space 21 of the hollow cylinder is connected with the P-supply connection 27 of the direction control valve 22, that is, with the pressure output 39 of the pressure reduction valve 38. By the switching of the direction control valve 22 in this function position I the clamp movement of the cylinder housing 17 begins a movement "towards the right", whereupon the pressure in the right pressure chamber 21 initially remains low, depending upon the resistance to movement. The pressure coupled into the first sensor chamber 111 is accordingly low and the second senor chamber 113 is relieved of pressure, with the consequence that the pretension of the valve spring 41 suffices to displace the control jacket 46 and the sensor pistons 106 and 107 along the stroke a in the direction towards the flange 78 to the position of the ring piston 107, that is, the position of the control jacket 46 and the piston 106 and 107 represented in FIG. 1. In the course of this slide movement the microswitch 117 is switched over, so that now the switch output signal is provided at the second output 121 of the microswitch or as the case may be at the second input 147 of the electronic control unit 145. As long as this is the case, that is, the cylinder housing 17 is so to speak freely moveable, until the pressure in the right pressure chamber 21 of the hydraulic cylinder 11 increases upon the contacting of the clamp jaw 34 on the workpiece 14, which pressure is necessary for clamping the clamping device 12, the rotation transmission 159 of the rotation spindle 16 cannot be activated.

Only when the pressure existing in this pressure chamber 21, which is also coupled to the first sensor chamber 111, reaches or exceeds the minimal value of 80% to 90% of the preset intended operating pressure as set by adjustment of the pretension of the valve spring 51, only then does the control jacket 46 supported sensor piston slide together therewith again in the direction of the ring shaped support surface 58 of the valve housing part 48 in the sense of a slight increase in the spring pretension, whereupon the micro-switch 117 returns to its base or starting position after approximately one-half value of the complete stroke a, in that the switch output signal is supplied to the first monitoring input 146 of the electronic control unit 145. The rotation drive 159 of the rotation spindle 16 is now activatable and can be adjusted manually or by computer program for the working operation of the rotation machine. That which has been described for internal clamping applies analogously to the external clamping.

Figure 2B:
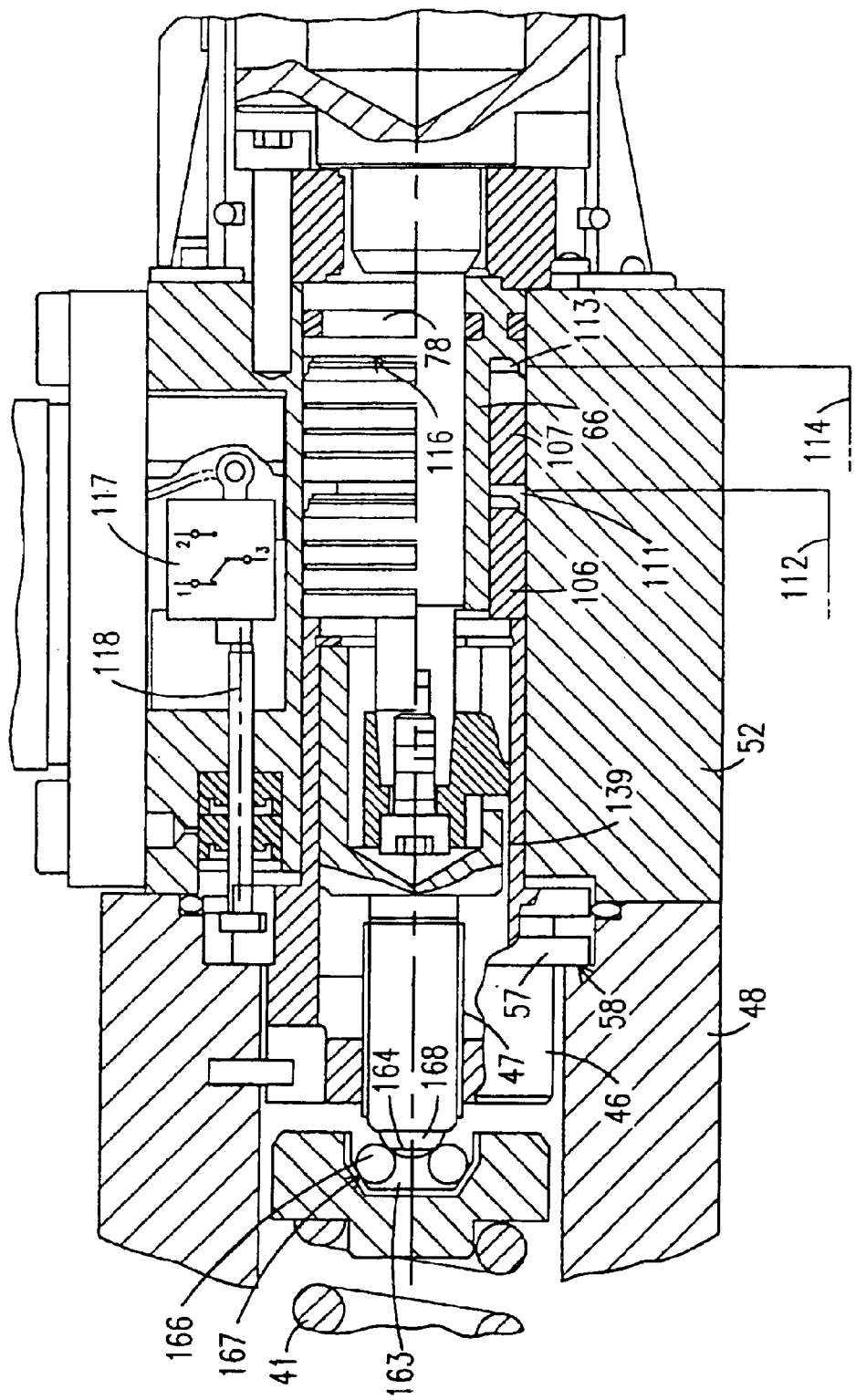

If the part of the hydraulic system subjected to operating pressure experiences a drop in pressure, caused for example by a break in the circuit, then the monitoring device reacts thereto by deflection of the control jacket out of its contact position represented in FIGS. 2a and 2b, and the micro-switch 117 is switched, with the consequence, that the rotation drive 159 is taken out of operation, in order to reduce the danger, which would result from a release of the clamping device 12.

A further safety function of the monitoring device 10 is achieved by an appropriate design of the electronic control unit 145 such that the elapsed necessary time span is measured, beginning with the switching of the direction control valve 22 required for the pre-selected clamp operating mode of functional position I or II, until the operating pressure required for setting the pressure reduction valve 38 is achieved, and this time span is compared with a characteristic value for the normal function of the clamping device 12.

If the measured time span is significantly shorter than the expected value, then this is an indication that the hydraulic cylinder 11 "has remained stationary"—is blocked—before the clamping effect is achieved, and the electronic control unit generates a combination of signals which prevents the rotation drive 159 from being activated. Further, a control signal is produced, by which the direction control valve 22 is again switched back to the open condition of the clamping device 12 associated function position II or I.

If the measured time span is significantly larger than the expected comparison value, then this is an indication therefore, that a leakage exists in the high pressure supply circuit, and again similarly a signal combination produced which prevents engagement of the rotation drive 159.

In order to establish defined conditions, which make possible the reliable evaluation of the elapsed time span measured from the switching of the valve 22 until the increase in pressure to the operating pressure, a flow control valve 162 is provided between the pressure reduction valve 38 and the P-supply connection 27 of the direction control valve 22, which maintains the hydraulic cylinder 11 supplied hydraulic oil flow at a defined value, which remains constant until just before the achievement of the operating pressure. The flow control valve 162 is preferably in the form of an adjustable valve, so that, for example in the case that a sensitive workpiece 13 or 14 is presented for processing and which must be processed with relatively low clamping pressure, a "careful"—slowed—approaching of the clamping position of the clamping jaws 34 is carried out with prevention of a surge or hammer increase of the pressure.

In order to keep the friction to be overcome during adjustment of the pretension of the valve spring 41 as low as possible, the spring plate 42 is supported via a central roller bearing 163 thereof at the free end 164 of the threaded spindle 47. This roller bearing 163 is in the form of a slant ball bearing, of which the bearing balls 166 are retained between, on the one hand, a plate spring side conical roller bearing surface 167 widening towards the free end 164 of the threaded spindle 47 and, on the other hand, the hemispherical free end 164 of the threaded spindle 47. The radius of the ball bearings 166 and the radius of the hemispherical support end 164 of the threaded spindle as well as the arrangement and tilt of the conical roller surface 167 of the spring plate 42 are dimensioned relative to each other sufficiently that the radius of the circular track 168, coaxial with the central axis 54 along which the bearing balls 166 can roll upon the hemispherical spindle end 164, is the same as or similar to the radius of the bearing balls 166.

What is claimed is:

1. Electrohydraulic monitoring device (10) for a dual acting hydraulic cylinder (11), which can be used in two alternative deflected configurations of its cylinder piston and its cylinder housing according to different functions by the alternative application and relief of pressure in two pressure spaces (19, 21) separated from each other by the cylinder piston, wherein for safety reasons it is necessary to maintain a defined operating pressure, for the presetting of which a pressure reduction valve (38) is provided, by means of which, from a high starting pressure of a pressure supply aggregate, a defined pressure can be derived and coupled into the appropriate pressure space for the respective function of the hydraulic cylinder (11), which pressure is preset by adjusting the pretension of a valve spring (41) by means of a spindle drive, which is provided in a spring space (137) which is under the pressure of hydraulic oil flowing out of the hydraulic system, which at its end is bordered or surrounded axially moveably by a control jacket (46), which is axially slideable within a limited axial stroke range (a) between alternative end positions demarked by abutment with housing elements, which are associated with the alternative switch positions of a switch (117) provided in an oil free housing space (122), which is operable by an adjoining element (118) moveably coupled with the control jacket, wherein for determination of the respective operating pressures coupled to the hydraulic cylinder two axially moveable sensor chambers are provided bordered by two sensor pistons (106, 107), each one respectively in communication with a pressure space (19, 21) of the cylinder, by which alternative application and relief of pressure the control jacket respectively is urged into the same end position with which one of the two switch positions of the electrical switch (117) is associated, characterized by the following characteristics:

a) the sensor piston is in the form of a ring piston, which radially outwardly is sealed against the central through-going bore (51) of a housing block (52) of the monitoring device (10) and radially inwardly is sealed against the outer jacket surface (102) of a slide guide pipe (66), which is sealed with a radial end flange (78) at the end segment of the bore (51) opposite to the spring (41) and secured against axial sliding relative to the housing block (52);

b) the control jacket (46) is in the form of a cylindrical pot; with its base directed towards the spring (41) and its jacket guided axially slideable in the central bore (51), with its jacket segment (49') facing towards the adjacent sensor piston (106), against which in the bore associated ring surface (77) the sensor piston (106) is axially supportable; the length of its axial deflection stroke (a) possible between the end position is marked by the abutment effect of a radial ring flange (56) of the control jacket with an oppositely arranged ring shaped housing side end surface (58 and 59), whereby the jacket is secured against rotation, c) the threaded spindle (47) extends as a projection from a base side of a cylindrical pot-shaped guide jacket (62)

mounted axially slideable and rotatable within the jacket of the control casing (46), and is guided in a through-going threaded bore (44) of a base (56) which provides the function of a spindle nut for the control casing (46) employed as spindle drive and engages with its free end centrally with an axially moveable spring plate (42) used for compressing the valve spring (41);

d) a control shaft is rotatably mounted centrally in the slide guide pipe (66), which has a projection (69) extending axially into the slide guide casing, which is provided with a radial coupling element (71) for rotation form-fitting coupling of the slide guide casing with the control shaft;

e) the internal space bordered by the control jacket (46) within the central bore (51) and the radial extending housing space (133), within which the radial outer flange (57) of the control casing is provided, is in communicating connection with the valve spring (41) and the spring plate (42) containing housing space (137);

f) the actuating element (118) of the micro-switch (117) is in the form of a slender pin, which extends through a bore (128) of the housing block (52) extending between the oil free receiving space of the micro-switch (117) and the ring space (133) receiving the radial outer flange (57) of the control casing (56), of which the central axis (127) runs parallel to the central longitudinal axis (54) of the housing (52, 48), is guided gliding and sealed against this bore (128) and by form fitting engagement with an anchor head (136) is moveably coupled with the anchor nut (134) of the ring flange (57) of the control casing (46) is coupled fixed for pulling and pushing therewith.

2. Monitoring device according to claim 1, wherein the through-bore (128) of the housing block (52) extending between the oil free receiving space (122) for the switch (117) and the radial flange (57) of the control jacket (46) receiving housing space (133), through which through-bore (128) the actuating element (118) extends, is in the form of a step-bore with a guide segment (129) in communication with the oil free receiving space (122), of which the diameter is at the same time corresponding to that of the needle-shaped actuating element (118) plus tolerances, and which includes a radially wider sealing segment on the side of the guide segment (129) communicating in the ring space (133), within which the actuating element (118) is sealed against the housing block (52) of the monitoring device (10).

3. Monitoring device according to claim 2, wherein for sealing of the actuating element (118) against the housing block (52) within the sealing segment of the step bore (128), two lip seals (131 and 132) are provided, which, viewed in the direction of the central axis (127) of the bore, are arranged sequentially.

4. Monitoring device according to claim 3, wherein a radial relief bore extends from the larger diameter bore step of the step bore (128), of which the bore side opening is in communication with the sealing area of the respective lip seal (132), which is provided adjacent the oil filled receiving space (133) for the ring flange (57) of the control casing (46).

5. Monitoring device according to claim 1, wherein the control shaft (68) is secured against axial displacement relative to the housing block (52) of the monitoring device (10), and that the rotation-coupling element (71) is in the form of a vane or key shaped element, which extends radially into a longitudinal slit (72) of the casing jacket (74) of the slide guide casing (66), of which the side walls on both sides are supported against the rotation coupling element (71).

6. Monitoring device according to claim 5, wherein the longitudinal slit (72) of the casing jacket (74) is in communicating connection with a longitudinal groove (139) of the slide guide casing (62) which communicates with the outer ring space (133) receiving the ring flange (57) of the control casing (46).

7. Monitoring device according to claim 1 wherein a value ($F_S$) of one control surface of the pressure reduction valve (38), upon which the application of pressure with the output pressure of the pressure reduction valve (38) provides the force employed for the set pre-tensioning of the valve spring (41), which leads to the regulating equilibrium of the pressure reduction valve for provision of the desired operating pressure, is smaller by a defined amount ($F_d$) than an effective amount ($F_R$) of the ring surfaces of the sensor piston (106, 107) which are to be exposed to the operating pressure existing in the hydraulic cylinder (11).

8. Monitoring device according to claim 1, wherein the threaded spindle (47) is supported axially, via a central roller bearing (163), against a spring plate (42), of which the axial displacement produces an adjustment of the pretension of the valve spring (41) of the pressure reduction valve (38).

9. Monitoring device according to claim 8, wherein the roller bearing (163) is a slant ball bearing, of which the ball bearings are tensioned between, on the spring-plate side, a conical roller support surface (167), widening towards the threaded spindle (47), and a hemispherical shaped roller bearing surface at the free end (164) of the threaded spindle (47).

10. Monitoring device according to claim 1, wherein an electric motor control means is provided for adjusting of the pretension of the valve spring (41) of the pressure reduction valve (38).

11. Monitoring device according to claim 10, wherein the electric motor is a step motor, which is controllable by driving with a predetermined number of control impulses, with which respectively one incremental adjusting step is associated, for carrying out the pretension control stroke.

12. Monitoring device according to claim 10, wherein a location measuring system is provided for monitoring the pretension-adjusting stroke of the spindle (47) and/or the valve spring (41).

13. Monitoring device according to claim 10, wherein for adjusting the pretension of the valve spring (41) a pressure regulation circuit is provided, which is supplied via an electronic or electrical pressure sensor (156) with the output pressure of an electronic control unit (145), which from a comparison of the actual pressure value and a pre-set intended value produces the necessary control signal for the electric motor adjustment device.

14. Monitoring device according to claim 1, wherein an electronic time measuring device is provided, which determines the span of time, which elapses beginning with the switching of the direction control valve (22) in a functional position I or II for the desired operating mode of the hydraulic cylinder (11), until the predetermined operating pressure is achieved by the adjustment of the pretension of the pressure reduction valve (38), and by the comparison of the measured time span with an expected value characteristic for a normal operation of the monitored hydraulic aggregate generates a malfunction sequence in the case that the measured time span is smaller or larger than the compared to time, or the operating pressure is not achieved.

15. Monitoring device according to claim 14, wherein a hydraulic control element is provided between the pressure reduction valve (38) and the hydraulic cylinder (11), which for the major portion of the time span, which passes between the switching over of the direction control valve (22) until achievement of the operating pressure, maintains the hydraulic oil flow flowing to the hydraulic cylinder (11) within a predefined value range.

16. Monitoring device according to claim 15, wherein the hydraulic control element is a flow regulating valve (162).

* * * * *